United States Patent
Yi

(10) Patent No.: US 12,036,999 B2
(45) Date of Patent: Jul. 16, 2024

(54) ROBUSTNESS QUOTIENT FOR VEHICLE DIAGNOSTICS AND MONITORING

(71) Applicant: Robert Bosch GmbH, Stuttgart (DE)

(72) Inventor: Ming Yi, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 607 days.

(21) Appl. No.: 16/945,003

(22) Filed: Jul. 31, 2020

(65) Prior Publication Data

US 2022/0032928 A1 Feb. 3, 2022

(51) Int. Cl.
*B60W 50/00* (2006.01)
*B60W 50/02* (2012.01)
*G06F 16/23* (2019.01)
*G07C 5/08* (2006.01)

(52) U.S. Cl.
CPC ..... *B60W 50/0205* (2013.01); *G06F 16/2379* (2019.01); *G07C 5/0808* (2013.01)

(58) Field of Classification Search
CPC ........... B60W 50/0205; G06F 16/2379; G07C 5/0808; G07C 5/008; G07C 2205/02; H04L 67/125; G05B 23/0262; G05B 2219/24065
See application file for complete search history.

(56) References Cited

U.S. PATENT DOCUMENTS

| | | | |
|---|---|---|---|
| 5,414,995 A * | 5/1995 | Tokuda | F01N 11/007 123/697 |
| 5,524,078 A | 6/1996 | Kolb et al. | |
| 7,252,072 B2 | 8/2007 | Slater et al. | |
| 7,457,785 B1 * | 11/2008 | Greitzer | G07C 3/00 706/12 |
| 7,664,595 B2 | 2/2010 | Groer et al. | |
| 7,693,649 B2 | 4/2010 | Groer et al. | |
| 9,476,341 B2 | 10/2016 | Whitt et al. | |

(Continued)

FOREIGN PATENT DOCUMENTS

| | | | | |
|---|---|---|---|---|
| AT | 514969 A2 * | 5/2015 | ............. | F02D 41/22 |
| CN | 105357255 A * | 2/2016 | | |

OTHER PUBLICATIONS

Autosar, "Specification of Diagnostic Event Manager—Autosar Cp Release 4.3.1," publicly available at least as early as Dec. 8, 2017 (511 pages).

*Primary Examiner* — Tiffany P Young
(74) *Attorney, Agent, or Firm* — Michael Best & Friedrich LLP

(57) ABSTRACT

Methods and systems for evaluating robustness of vehicle diagnostics and monitoring. One system includes a memory, a communication interface, and an electronic processor. The electronic processor is configured to access diagnostic event data of a vehicle system. The electronic processor is also configured to determine a RQ variable for the current operation cycle based on a set of maximum debounce levels included in the diagnostic event data and a failure threshold. The electronic processor is also configured to store, in the memory, the RQ variable as RQ data at an end of the current operation cycle. The electronic processor is also configured to transmit, via the communication interface, the RQ data for an external robustness evaluation. The electronic processor is also configured to receive, via the communication interface, an update to the failure threshold based on the external robustness evaluation.

7 Claims, 5 Drawing Sheets

(56) References Cited

U.S. PATENT DOCUMENTS

| | | | |
|---|---|---|---|
| 2002/0150050 A1* | 10/2002 | Nathanson | H04L 69/04 |
| | | | 370/254 |
| 2014/0366515 A1 | 12/2014 | Kowalkowski et al. | |
| 2016/0003710 A1* | 1/2016 | Qiao | G01M 15/104 |
| | | | 73/23.32 |
| 2017/0123784 A1* | 5/2017 | Zymeri | G06F 8/654 |
| 2017/0228946 A1* | 8/2017 | Tseng | G05B 23/0297 |
| 2018/0033223 A1* | 2/2018 | Gortsas | G01J 1/0228 |
| 2018/0321669 A1* | 11/2018 | Haas | G05B 19/0428 |

* cited by examiner

ROBUSTNESS QUOTIENT FOR VEHICLE DIAGNOSTICS AND MONITORING

Embodiments relate to vehicle diagnostics and monitoring, and, more particularly, to a robustness quotient for vehicle diagnostics and monitoring.

SUMMARY

Vehicle diagnostics and monitoring systems generally implement one or more diagnostic monitors that detect a set of diagnostic events for one or more vehicle systems (for example, a braking control system, a driver assistance system, and the like). A diagnostic event generally refers to a measurement or value representing the status of a diagnostic monitor. A diagnostic monitor (or diagnostic function) determines whether a corresponding vehicle system is functioning properly (for example, experiencing a malfunction or fault). Additionally, vehicle diagnostics and monitoring systems typically implement debouncing. Debouncing is a specific mechanism used to evaluate whether a diagnostic event qualifies for fault maturation based on, for example, one or more parameters or thresholds (for example, a failure threshold). Accordingly, whether a diagnostic event is qualified for fault maturation (i.e., whether the diagnostic event triggers a diagnostic trouble code or error code) is based on, at least in part, a failure threshold. Traditionally, the failure threshold is defined by a functional owner based on testing or experience. However, the failure threshold is not always an optimized value. As one example, where the failure threshold is too sensitive, a fault (or diagnostic trouble code) may be triggered pre-maturely before a corresponding component or system actually needs servicing. This is especially true for a new vehicle system that does not have a sufficient amount of associated data.

To solve these and other problems, the embodiments described herein provide, among other things, methods and systems for evaluating robustness of vehicle diagnostics and monitoring based on a field data analysis. Accordingly, embodiments described herein relate to determining a robustness quotient ("QR") variable associated with diagnostic event data for one or more vehicle systems and adding the QR variable to the diagnostic event data (as QR data). A remote or external robustness analysis or evaluation for associated vehicle diagnostics and monitoring may be performed on QR data for one or more vehicles, diagnostic event data for one or more vehicles, or a combination thereof. Alternatively or in addition, the remote or external robustness analysis evaluation may be performed on secondary source data from one or more secondary sources (for example, a repair shop, a dealership, an original equipment manufacturer ("OEM"), and the like). In some embodiments, the remote or external robustness analysis or evaluation is used to determine whether one or more parameters or thresholds (such as a failure threshold) warrants updating or adjusting to improve or optimize robustness of the associated vehicle diagnostics and monitoring. As one example, where the evaluation indicates that a failure threshold is too sensitive (too low), the failure threshold may need to be updated such that a sensitivity of the failure threshold is decreased.

For example, one embodiment provides a system for evaluating robustness of vehicle diagnostics and monitoring. The system includes a memory, a communication interface, and an electronic processor coupled to the memory and the communication interface. The electronic processor is configured to access diagnostic event data for a current operation cycle of a vehicle system. The electronic processor is also configured to determine a robustness quotient (RQ) variable for the current operation cycle, the RQ variable based on a maximum debounce level included in the diagnostic event data and a failure threshold. The electronic processor is also configured to store, in the memory, the RQ variable as RQ data at an end of the current operation cycle. The electronic processor is also configured to transmit, via the communication interface, the RQ data for an external robustness evaluation. The electronic processor is also configured to receive, via the communication interface, an update to the failure threshold of the diagnostic monitor based on the external robustness evaluation.

Another embodiment provides a method for evaluating robustness of vehicle diagnostics and monitoring. The method includes accessing diagnostic event data of a vehicle system. The method also includes determining, with an electronic processor, a first robustness quotient (RQ) variable based on a set of maximum debounce levels included in the diagnostic event data and a failure threshold. The method also includes storing, in memory, the first RQ variable as a first data entry in a RQ data log at an end of the first operation cycle. The method also includes transmitting the RQ data log for an external robustness evaluation. The method also includes receiving, via a communication interface, an update to the failure threshold based on the external robustness evaluation. The method also includes updating, with the electronic processor, the failure threshold based on the update.

Yet another embodiment provides a non-transitory, computer-readable medium storing instructions that, when executed by an electronic processor, perform a set of functions. The set of functions includes accessing diagnostic event data of the vehicle system. The set of functions also includes determining a robustness quotient (RQ) variable, the RQ variable based on a set of maximum debounce levels included in the diagnostic event data and a failure threshold. The set of functions also includes storing the RQ variable as RQ data at an end of the current operation cycle. The set of functions also includes transmitting the RQ data for an external robustness evaluation. The set of functions also includes receiving an update to the failure threshold based on the external robustness evaluation. The set of functions also includes updating the failure threshold based on the update.

Other aspects and embodiments will become apparent by consideration of the detailed description and accompanying drawings.

DETAILED DESCRIPTION

Before any embodiments are explained in detail, it is to be understood that the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
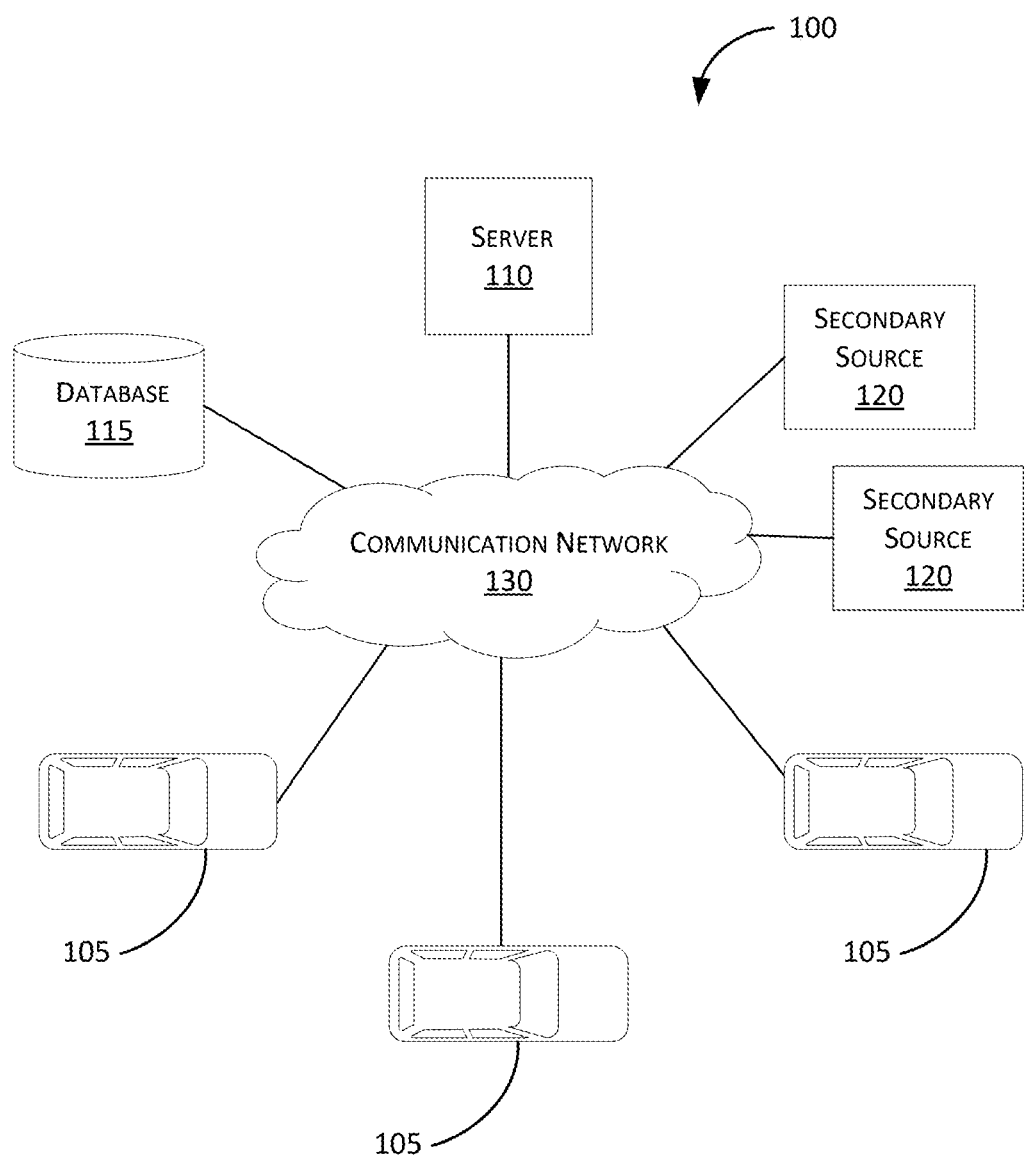
FIG. 1 schematically illustrates a system for evaluating robustness of vehicle diagnostics and monitoring according to some embodiments.

FIG. 1 illustrates a system 100 for vehicle diagnostics and monitoring according to some embodiments. In the example illustrated, the system 100 includes a plurality of vehicles 105 (referred to herein collectively as "the vehicles 105" and individually as "the vehicle 105"), a server 110, a database 115, and a plurality of secondary sources 120 (referred to herein collectively as "the secondary sources 120" and individually as "the secondary source 120"). In some embodiments, the system 100 includes fewer, additional, or different components than those illustrated in FIG. 1 in various configurations and may perform additional functionality than the functionality described herein. As one example, the system 100 may include multiple servers 110, databases 115, or a combination thereof. As another example, although FIG. 1 illustrates three vehicles 105 and two secondary sources 120, the system 100 may include any number of vehicles 105 and secondary sources 120.

The vehicles 105, the server 110, the database 115, and the secondary sources 120 communicate over one or more wired or wireless communication networks 130. Portions of the communication networks 130 may be implemented using a wide area network ("WAN"), such as the Internet, a local area network ("LAN"), such as a Bluetooth™ network or Wi-Fi, and combinations or derivatives thereof. Alternatively or in addition, in some embodiments, components of the system 100 communicate directly as compared to through the communication network 130.

Figure 2:
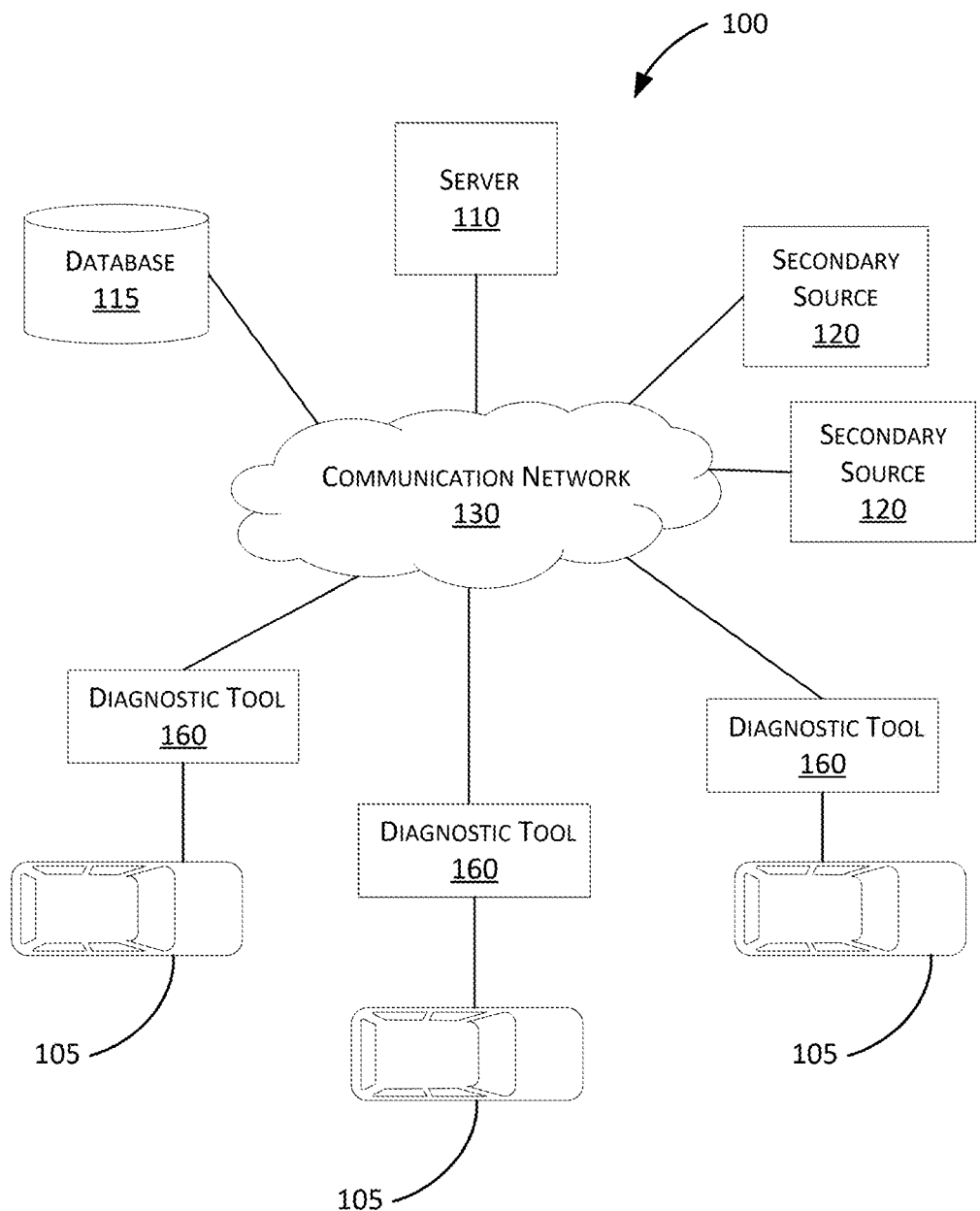
FIG. 2 schematically illustrates the system of FIG. 1 including diagnostic tools according to some embodiments.

Also, in some embodiments, one or more components of the system 100 communicate through one or more intermediary devices. As one example, a vehicle 105 may communicate with one or more components of the system 100 through a diagnostic tool 160, as seen in FIG. 2. A diagnostic tool 160 may include, for example, a hand-held device that communicates with a vehicle 105. As one example, the diagnostic tool 160 may be used by personnel at a repair shop or service center to diagnosis a vehicle 105. The diagnostic tool 160 may diagnosis the vehicle 105 by receiving data from the vehicle 105, a user of the diagnostic tool 160, or a combination thereof. The diagnostic tool 160 may include an input/output interface that communicates with a communication port or bus of the vehicle 105, such as a controller area network ("CAN") bus, an on-board diagnostic ("OBD") bus, and the like. As one example, the input/output interface may include a port or connector for receiving a cable that allows the diagnostic tool 160 to read diagnostic data, such as diagnostic event data, robustness quotient data, and the like (as described in greater detail below), from a communication bus of the vehicle 105. The diagnostic tool 160 may then communicate the diagnostic data read from the vehicle 105 to one or more components of the system 100 through the communication network 130. As one example, the diagnostic tool 160 may communicate the diagnostic data to the database 115 for storage. As another example, the diagnostic tool 160 may communicate the diagnostic data to the server 110 for remote or external robustness diagnostics or evaluation.

Figure 3:
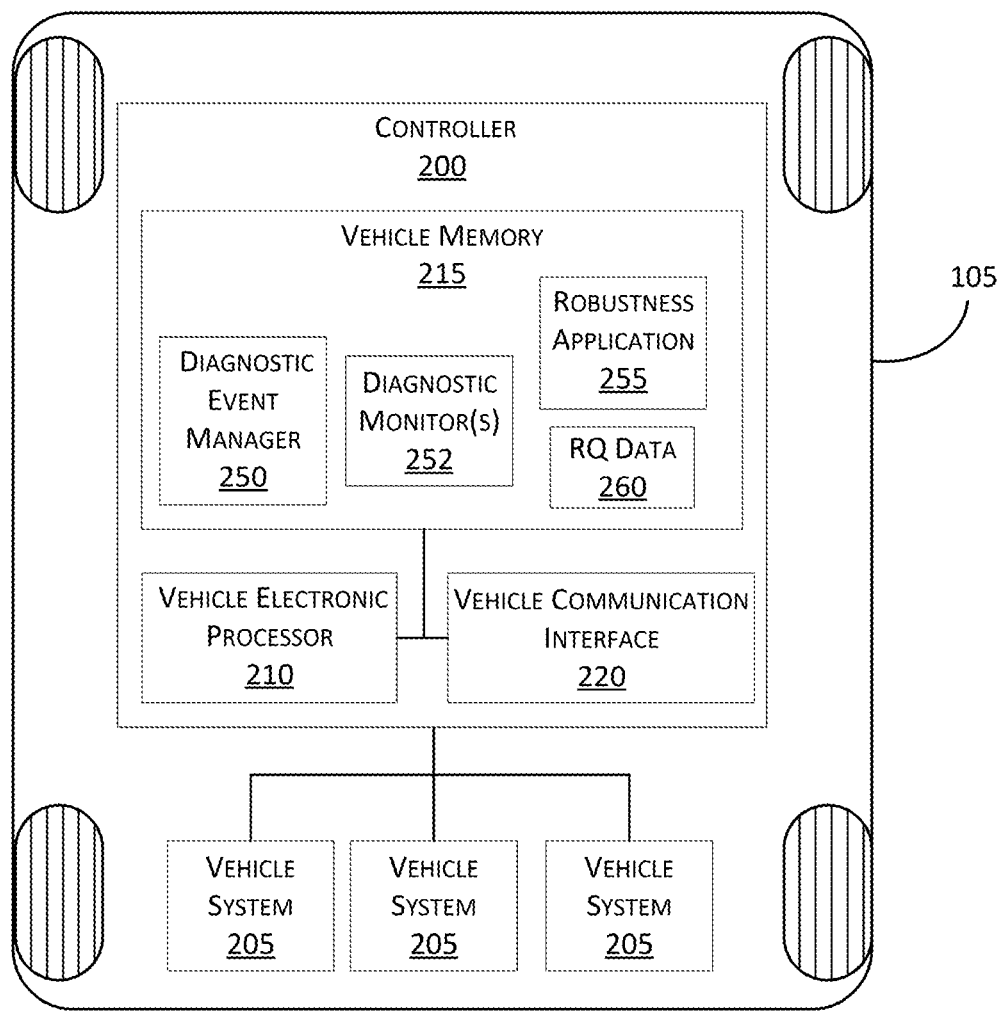
FIG. 3 schematically illustrates a vehicle of the system of FIG. 1 according to some embodiments.

The vehicles 105, although illustrated as four-wheeled vehicles, may encompass various types and designs of vehicles. For example, a vehicle 105 may be an automobile, a motorcycle, a truck, a bus, a semi-tractor, or another type of vehicle. As seen in FIG. 3, a vehicle 105 may include a controller 200 and a plurality of vehicle systems 205 (referred to herein as "the vehicle systems 205" and individually as "the vehicle system 205"). In some embodiments, the vehicle 105 includes fewer, additional, or different components than those illustrated in FIG. 3 in various configurations and may perform additional functionality than the functionality described herein. For example, although FIG. 3 illustrates three vehicle systems 205, the vehicle 105 may include any number of vehicle systems 205. Additionally, in some embodiments, the vehicle 105 includes a vehicle communication interface, such as a vehicle transceiver (not shown), that communicates with one or more components of the system 100 over the communication network 130 and, optionally, one or more other communication networks or connections.

A vehicle system 205 may include, for example, a brake control system, an acceleration control system, a driver assistance system, and the like. Each vehicle system 205 may include one or more components for performing the functionality associated with the vehicle system 205 (such as an accelerator, a braking mechanism, or the like), one or more components for performing vehicle diagnostics and monitoring (such as a temperature sensor, a timer, or another type of diagnostic sensor or device), or a combination thereof.

As illustrated in FIG. 3, the controller 200 includes a vehicle electronic processor 210 (for example, a microprocessor, an application specific integrated circuit ("ASIC"), or another suitable electronic device), a vehicle memory 215 (for example, one or more non-transitory computer-readable storage mediums), and a vehicle communication interface 220. The vehicle electronic processor 210, the vehicle memory 215, and the vehicle communication interface 220 communicate wirelessly, over one or more data connections or buses, or a combination thereof. The controller 200 illustrated in FIG. 3 represents one example, and, in some embodiments, the controller 200 includes fewer, additional, or different components in different configurations than illustrated in FIG. 3.

The controller 200 may be implemented in several independent controllers (for example, programmable electronic controllers) each configured to perform specific functions or sub-functions. Alternatively or in addition, the controller 200 may contain sub-modules that include additional electronic processors, memory, or ASICs for handling input/output functions, processing of signals, and application of the methods listed below. Also, in some embodiments, the controller 200 performs functionality in addition to the functionality described herein. In some embodiments, the controller 200 is a preexisting component or controller of the vehicle 105. As one example, the controller 200 may be a preexisting controller of an on-board diagnostic system of the vehicle 105. Alternatively or in addition, in some embodiments, the controller 200 is associated with one or more of the vehicle systems 205. As one example, the controller 200 may be a controller associated with an acceleration control system of the vehicle 105.

The vehicle electronic processor 210 is configured to access and execute computer-readable instructions ("software") stored in the vehicle memory 215. The software may include firmware, one or more applications, program data, filters, rules, one or more program modules, and other executable instructions. For example, the software may include instructions and associated data for performing a set of functions, including the methods described herein.

As one example, as illustrated in FIG. 3, the vehicle memory 215 may store a diagnostic event manager ("DEM") 250. The DEM 250 is a software application executable by the vehicle electronic processor 210. As described in greater detail below, the vehicle electronic processor 210 executes the DEM 250 to perform vehicle diagnostics and monitoring for one or more vehicle systems 205. In some embodiments, the DEM 250 handles and stores a set of diagnostic events of a vehicle system 205 detected by a diagnostic monitor 252 (also stored in the vehicle memory 215). A diagnostic event generally refers to a measurement or value representing the status of a diagnostic monitor 252. A diagnostic monitor 252 (or diagnostic function) determines whether a vehicle system 205 (or component thereof) is functioning properly (or experiencing a malfunction or fault). Alternatively or in addition, a diagnostic monitor 252 may identify a specific fault type (for example, a short to ground fault, an open load fault, an over heat fault, or the like). Accordingly, each vehicle system 205 (or a component thereof) may be monitored by one or more diagnostic monitors 252.

In some embodiments, the DEM 250, one or more diagnostic monitors 252, or a combination thereof performs debouncing. Debouncing is a specific mechanism used to evaluate whether a diagnostic event qualifies for fault maturation based on, for example, one or more parameters or thresholds (for example, a failure threshold). The DEM 250, one or more diagnostic monitors 252, or a combination thereof may perform debouncing using a debounce function. Each debounce function may be associated with at least one failure threshold. A debounce function may be, for example, a counter-based debounce function, a time-based debounce function, or another type of debounce function. For a counter-based debounce function, a diagnostic event is qualified for fault maturation when the diagnostic event satisfies (for example, equals or exceeds) a counter threshold (as a failure threshold of the counter-based debounce function). As one example, where the counter threshold is five, a diagnostic event is qualified for fault maturation when the diagnostic event is the fifth diagnostic event in a row satisfying an underlying condition. For a time-based debounce function, a diagnostic event is qualified for fault maturation when the diagnostic event satisfies (for example, equals or exceeds) a time threshold (as a failure threshold of the time-based debounce function). As one example, where the time threshold is ten seconds, a diagnostic event is qualified for fault maturation when the diagnostic event satisfies an underlying condition and the underlying condition has occurred for at least ten seconds.

Accordingly, in some embodiments, the DEM 250 performs vehicle diagnostics and monitoring for one or more of the vehicle systems 205. Based on the vehicle diagnostics and monitoring, the DEM 250 generates diagnostic event data. The diagnostic event data may include, for example, a report or set of diagnostic events (for example, raw diagnostic event data), debounce data (for example, a debounce level associated with each diagnostic event), a status for each diagnostic event (for example, whether the diagnostic event qualified for fault maturation), and the like.

As one example, a diagnostic monitor 252 may be configured to monitor a temperature of a vehicle system 205. The vehicle system 205 may be associated with an underlying condition threshold (in this example, a temperature threshold). According to this example, each diagnostic event is a temperature value, such as 90□ or 105□. The DEM 250 may perform debouncing (using a debounce function) on each diagnostic event. For this example, the temperature threshold associated with the vehicle system 205 may be 100□ and the failure threshold of an associated count-based debounce function may be four counts. Table 1 (below) illustrates an example set of diagnostic events and an associated debounce level and fault status for each diagnostic event, according to this example. As seen in Table 1, the debounce level increases (by a count) when the diagnostic event exceeds the temperature threshold. The fault status remains "No Fault" until the failure threshold of the associated debounce function is exceeded (in this example, once the debounce level reaches four counts). Once the failure threshold is satisfied, a fault is triggered.

TABLE 1

| Diagnostic Event No. | Diagnostic Event (□) | Debounce Level (Count) | Fault Status (Fault/No Fault) |
|---|---|---|---|
| First Diagnostic Event | 103□ | 1 | No Fault |
| Second Diagnostic Event | 101□ | 2 | No Fault |
| Third Diagnostic Event | 102□ | 3 | No Fault |
| Fourth Diagnostic Event | 104□ | 4 | Fault |

As seen in FIG. 3, the vehicle memory 215 may also store a robustness application 255. The robustness application 255 is a software application executable by the vehicle electronic processor 210. As described in greater detail below, the vehicle electronic processor 210 executes the robustness application 255 to determine (or generate) robustness quotient ("RQ") data 260 (also stored in the vehicle memory 215) associated with the diagnostics and monitoring of the one or more vehicle systems 205 (for example, the diagnostic event data of the DEM 250). The RQ data 260 is a set of (or a log of) RQ variables (or values), where each RQ variable is associated with a diagnostic monitor 252. In some embodiments, each RQ variable is saved at an end of an operation cycle in the vehicle memory 215. An operation cycle may include, for example, an ignition cycle, a power cycle, an OBD driving cycle, an engine warming cycle, or the like. In some embodiments, the RQ data 260 is a RQ data log including a plurality of data entries, where each data entry corresponds to a RQ variable. In some embodiments, each RQ variable is saved as a data entry with an identifier of the corresponding diagnostic monitor 252. In such embodiments, each data entry may include three bytes of data. As one example, a log entry may include three bytes of data where two bytes represent the identifier of the corresponding diagnostic monitor 252 and one byte represents the RQ variable.

The communication interface 220 allows the controller 200 to communicate with devices external to the controller 200 (for example, receive input from and provide output to devices external to the controller 200). As one example, as seen in FIG. 3, the controller 200 may be communicatively connected to the vehicle systems 205. In some embodiments, the communication interface 220 includes a port for receiving a wired connection with devices external to the controller 200. Accordingly, in some embodiments, the controller 200 is directly coupled via a dedicated wire to one or more of the vehicle systems 205. Alternatively or in addition, the communication interface 220 communicates with a communication bus to indirectly communicate with devices external to the controller 200. Accordingly, in some embodiments, the controller 200 is communicatively coupled to one or more of the vehicle systems 205 via a shared communication link, such as a vehicle communication network or bus (for example, a CAN bus, an OBD bus, an Ethernet, or a FlexRay) or a wireless connection. Each of the vehicle systems 205 may communicate with the controller 200 using various communication types and protocols.

Figure 4:
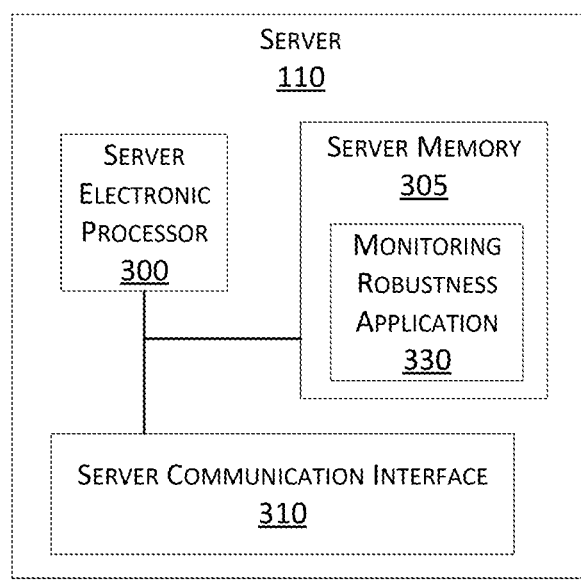
FIG. 4 schematically illustrates a server of the system of FIG. 1 according to some embodiments.

As noted above, the system 100 also includes the server 110. The server 110 includes a computing device, such as a server, a database, or the like. As illustrated in FIG. 4, the server 110 includes a server electronic processor 300, a server memory 305, and a server communication interface 310. The server electronic processor 300, the server memory 305, and the server communication interface 310 communicate wirelessly, over one or more communication lines or buses, or a combination thereof. The server 110 may include additional, fewer, or different components than those illustrated in FIG. 4 in various configurations. As one example, the server 110 may also include one or more human machine interfaces, such as a keyboard, keypad, mouse, joystick, touchscreen, display device, printer, speaker, and the like, that receive input from a user, provide output to a user, or a combination thereof. The server 110 may also perform additional functionality other than the functionality described herein. Also, the functionality (or a portion thereof) described herein as being performed by the server 110 may be distributed among multiple servers or devices (for example, as part of a cloud service or cloud-computing environment).

The server communication interface 310 may include a transceiver that communicates with one or more components of the system 100 over the communication network 130 and, optionally, one or more other communication networks or connections. The server electronic processor 300 includes a microprocessor, an ASIC, or another suitable electronic device for processing data, and the server memory 305 includes a non-transitory, computer-readable storage medium. The server electronic processor 300 is configured to retrieve instructions and data from the server memory 305 and execute the instructions. As illustrated in FIG. 4, the server memory 305 includes a monitoring robustness application 330 (referred to herein as "the application 330"). The application 330 is a software application executable by the server electronic processor 300. The server electronic processor 300 executes the application 330 to perform a remote or external robustness analysis or evaluation for associated vehicle diagnostics and monitoring (as a field data analysis). In some embodiments, the application 330 accesses and analyzes diagnostic data to evaluate a robustness of one or more parameters or thresholds (such as a failure threshold). As one example, the application 330 accesses diagnostic data for a first vehicle system, where the diagnostic data originates from a plurality of different sources, such as multiple vehicles 105, multiple secondary sources 120, or a combination thereof. Based on the robustness evaluation, the application 330 may determine whether one or more parameters or thresholds warrants updating or adjusting to improve or optimize robustness.

In some embodiments, the application 330 also determines and provides an update to a parameter or threshold. As one example, where the diagnostic data indicates that a failure threshold is too sensitive (too low), the application 330 may provide an update that increases the failure threshold (such that a sensitivity of the failure threshold is decreased). As another example, where the diagnostic data indicates that a failure threshold is too strict (too high), the application 330 may provide an update that decreases the failure threshold (such that a sensitivity of the failure threshold is increased).

Returning to FIG. 1, the system 100 also includes one or more secondary sources 120. A secondary source 120 may include, for example, an automotive dealership, an automotive repair shop, a remote diagnostic service provider, an original equipment manufacturer ("OEM"), a component supplier, or the like. A secondary source 120 may provide (or collect) additional diagnostic data (for example, secondary source data). As one example, an OEM may return bad or damaged components to a component supplier. The component supplier may perform an analysis on the returned components to determine whether each component is actually damaged or bad. The result of the analysis may indicate that a majority of the components are actually still functioning properly. Such results may suggest that a failure threshold associated with the returned components is too sensitive. Accordingly, the analysis performed by the component supplier may result in additional diagnostic data (secondary source data) that provides insight on monitoring robustness.

As seen in FIG. 1, the system 100 also includes the database 115. The database 115 may store RQ data, diagnostic event data, or a combination thereof for one or more vehicles 105. Alternatively or in addition, the database 115 may store secondary source data (additional diagnostic data) for one or more secondary sources 120. Accordingly, in some embodiments, one or more of the vehicles 105 transmit RQ data, diagnostic event data, or a combination thereof to the database 115 for storage. Additionally, in some embodiments, one or more of the secondary sources 120 transmits associated secondary source data 270 to the database 115 for storage. Accordingly, in some embodiments, the database 115 stores filed data (diagnostic data from the field).

Figure 5:
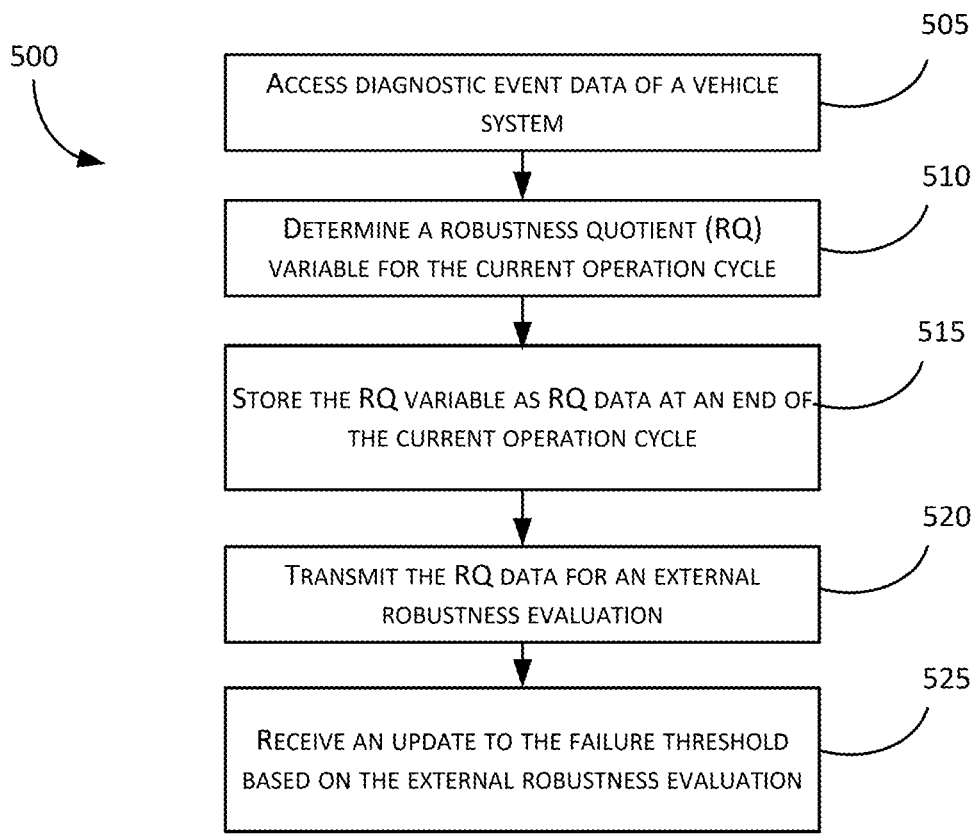
FIG. 5 schematically illustrates a flowchart of a method for evaluating robustness of vehicle diagnostics and monitoring performed by the system of FIG. 1 according to some embodiments.

FIG. 5 is a flowchart illustrating a method 500 of evaluating robustness of vehicle diagnostics and monitoring performed by the system 100 according to some embodiments. The method 500 is described as being performed by the controller 200 (for example, the DEM 250, the robustness application 255, or a combination thereof as executed by the vehicle electronic processor 210). However, the functionality (or a portion thereof) described with respect to the method 500 may be performed by other components or devices.

As illustrated in FIG. 5, the method 500 includes accessing diagnostic event data for a vehicle system 205 (at block 505). As noted above, during an operation cycle, the DEM 250 (via at least one diagnostic monitor 252) detects a set of diagnostic events (or measurement values) for a vehicle system 205 and performs debouncing (using at least one debounce function) with respect to the set of diagnostic events. As a result of the debouncing, each diagnostic event is associated with a debounce level and a fault status. Accordingly, for each operation cycle, the DEM 250 generates diagnostic event data for each diagnostic monitor 252, where the diagnostic event data includes the set of diagnostic events that occurred during a current operation cycle and the associated debounce level and fault status for each of the diagnostic events included in the set of diagnostic events. Accordingly, in some embodiments, the vehicle electronic processor 210 accesses the diagnostic event data from the vehicle memory 215.

After accessing the diagnostic event data (at block 505), the vehicle electronic processor 210 (via the robustness application 255) determines a robustness quotient ("RQ") variable for a current operation cycle of the vehicle system 205 (at block 510). In some embodiments, the vehicle electronic processor 210 determines the RQ variable based on a set of maximum debounce levels included in the diagnostic event data and a failure threshold. In some embodiments, the vehicle electronic processor 210 analyzes the diagnostic event data to determine (or identify), for each operation cycle, a maximum debounce level for each diagnostic event (as a set of maximum debounce levels). After determining the set of maximum debounce levels, the vehicle electronic processor 210 may determine the RQ variable by averaging, for each operation cycle, the quotient of the maximum debounce level for each operation cycle divided by the failure threshold. For example, in some embodiments, the vehicle electronic processor 210 determines the RQ variable using the following equation:

$$RQ_{AVE} = \text{Average}(\text{maxDL}_i/\text{Failure Threshold}, \text{maxDL}_{i+1}/\text{Failure Threshold}, \ldots \text{maxDL}_{1+n}/\text{Failure Threshold})$$

where maxDL represents a maximum debounce level for a given operation cycle and $RQ_{AVE}$ represents the average RQ across each operation cycle. As one example, Table 2 illustrates example $RQ_{AVE}$ variables calculated at the end of each operation cycle.

TABLE 2

| Operation Cycle No. | Failed threshold | $\text{maxDL}_i$ | $RQ_{ave}$ |
|---|---|---|---|
| First Operation Cycle | 4 | $\text{maxDL}_1 = 3$ | 75% = 3/4 |
| Second Operation Cycle | 4 | $\text{maxDL}_2 = 2$ | 62% = (3/4 + 2/4)/2 |
| Third Operation Cycle | 4 | $\text{maxDL}_3 = 1$ | 50% = (3/4 + 2/4 + 1/4)/3 |
| Fourth Operation Cycle | 4 | $\text{maxDL}_4 = 4$ | 83% = (3/4 + 2/4 + 1/4 + 4/4)/4 |

In some embodiments, the vehicle electronic processor 210 determines the RQ variable by determining, across each operation cycle, the largest or maximum quotient of the maximum debounce level for each operation cycle divided by the failure threshold. For example, in some embodiments, the vehicle electronic processor 210 determines the RQ variable using the following equation:

$$RQ = \text{Maximum}(\text{maxDL}_i/\text{Failure Threshold}, \text{maxDL}_{i+1}/\text{Failure Threshold}, \ldots \text{maxDL}_{i+n}/\text{Failure Threshold})$$

As seen in FIG. 5, the vehicle electronic processor 210 stores (for example, in the vehicle memory 215), the RQ variable as RQ data at an end of the current operation cycle (at block 515). As described above, RQ data may be a RQ data log including a plurality of data entries, where each data entry corresponds to a RQ variable. In some embodiments, each RQ variable is saved as a data entry with an identifier of the corresponding diagnostic monitor 252. In some of these embodiments, each data entry may include three bytes of data. As one example, a log entry may include three bytes of data where two bytes represent the identifier of the corresponding diagnostic monitor 252 and one byte represents the RQ variable. In other embodiments, a different number of bytes of data may be stored for the identifier, RQ variable, and log entry. Storing the RQ variable as RQ data at an end of the current operation cycle includes storage that occurs at approximately the end of the current operation cycle as well as storage that occurs at a later time after the end of the current operation cycle.

In some embodiments, before proceeding to block 520, the vehicle electronic processor 210 repeats blocks 505-515 of method 500 for one or more additional operation cycles. In some embodiments, the vehicle electronic processor 210 resets each debounce level at the start of each operation cycle. For example, at the start of each operation cycle, each debounce level is set to zero.

As seen in FIG. 5, the vehicle electronic processor 210 transmits (via the vehicle communication interface 220) the RQ data for an external robustness evaluation (at block 520). In some embodiments, the vehicle electronic processor 210 transmits the RQ data to the server 110 for the external robustness evaluation (for example, for analysis by the application 330). Alternatively or in addition, the vehicle electronic processor 210 transmits the RQ data to the database 115 for storage, such that the RQ data is accessible from the database 115 by the server 110. In some embodiments the vehicle electronic processor transmits the RQ data in response to receiving a request for the RQ data. The vehicle electronic processor 210 may receive a request from the server 110, an intermediary device, such as a diagnostic tool 160 of FIG. 2, another remote device or system, or a combination thereof. In some embodiments, the vehicle electronic processor 210 transmits additional data, such as the diagnostic event data, for the external robustness evaluation.

As described in greater detail above, in some embodiments, the server 110 (the server electronic processor 300 executing the application 330) accesses (or receives) diagnostic data including, for example, RQ data, diagnostic event data, secondary source data, or a combination thereof as part of performing an external robustness evaluation for associated vehicle diagnostics and monitoring. As one example, in some embodiments, the application 330 accesses and analyzes diagnostic data, such as RQ data associated with one or more vehicles 105, to evaluate a robustness of one or more parameters or thresholds (such as a failure threshold). Based on the evaluation, the application 330 may determine whether one or more parameters or thresholds warrants updating or adjusting to improve or optimize robustness of the associated vehicle diagnostics and monitoring (for example, when the failure threshold is too sensitive or too strict, as described above). In some embodiments, the application 330 also determines and provides an update to a parameter or threshold.

Accordingly, as seen in FIG. 5, in some embodiments, the vehicle electronic processor 210 receives (via, for example, the vehicle communication interface 220), an update to the failure threshold based on the external robustness evaluation (at block 525). The vehicle electronic processor 210 may receive the update from the server 110 through the communication network 130. In response to receiving the update, the vehicle electronic processor 210 may update the failure threshold based on the update. For example, the new value for the failure threshold may be stored in the vehicle memory 215 and then accessed by the vehicle electronic processor 210 when executing the DEM 250 or by other systems implementing debouncing. In some embodiments, the method 500 loops back to step 505 such that the method 500 is repeated to continuously update the failure threshold(s) based on external robustness evaluations. Thus, as additional data is available, the failure thresholds may continue to be updated overtime based on further RQ data sets.

Thus, the embodiments provide, among other things, methods and systems for evaluating robustness of vehicle diagnostics and monitoring. Various features and advantages of certain embodiments are set forth in the following claims.

What is claimed is:

1. A vehicle diagnostics system, the system comprising:
   a memory;
   a communication interface; and
   an electronic processor coupled to the memory and the communication interface, the electronic processor configured to
   receive a measurement from a diagnostic sensor of a component of a vehicle system,
   compare the measurement to a fault threshold,
   generate, based on the comparison, a robustness quotient (RQ) variable associated with the component of the vehicle system for a current operation cycle and of a diagnostic monitor of the vehicle system, the RQ variable also being based on a set of maximum debounce levels included in the failure threshold,
   store, in the memory, the RQ variable as RQ data at an end of the current operation cycle,
   transmit, via the communication interface, the RQ data for an external robustness evaluation,
   receive, via the communication interface, an update to the failure threshold based on the external robustness evaluation, generating an updated failure threshold from the update,
   perform a diagnosis of the component of the vehicle system according to the updated failure threshold to determine a component fault, and
   output a fault when the updated failure threshold is exceeded.

2. The system of claim 1, wherein the generating the RQ variable is further based on diagnostic event data of the vehicle system and wherein the diagnostic event data includes a set of diagnostic events and a debounce level for each diagnostic event included in the set of diagnostic events.

3. The system of claim 2, wherein a maximum debounce level of the set of maximum debounce levels is the highest debounce level among the debounce levels associated with the set of diagnostic events.

4. The system of claim 1, wherein the RQ variable is an average of each maximum debounce level included in the set of maximum debounce levels divided by the failure threshold.

5. The system of claim 1, wherein the RQ variable is a maximum of each maximum debounce level included in the set of maximum debounce levels divided by the failure threshold.

6. The system of claim 1, wherein the electronic processor is configured to transmit the RQ data for the external robustness evaluation in response to receiving a request for the RQ data.

7. The system of claim 1, wherein the update is further based on at least one selected from a group consisting of secondary source data and additional data associated with at least one other vehicle.

* * * * *